United States Patent
Tadokoro et al.

[11] Patent Number: 6,147,162
[45] Date of Patent: Nov. 14, 2000

[54] ACRYLIC FILM AND MOLDINGS MADE USING THE SAME

[75] Inventors: Yoshio Tadokoro, Shiga; Yousuke Tsukuda, Osaka, both of Japan

[73] Assignee: Sumitomo Chemical Company, Limited, Osaka, Japan

[21] Appl. No.: 09/125,264

[22] PCT Filed: Feb. 13, 1997

[86] PCT No.: PCT/JP97/00382

§ 371 Date: Aug. 12, 1998

§ 102(e) Date: Aug. 12, 1998

[87] PCT Pub. No.: WO97/30117

PCT Pub. Date: Aug. 21, 1997

[30] Foreign Application Priority Data

Feb. 16, 1996 [JP] Japan .................................. 8-029048

[51] Int. Cl.$^7$ ............................. C08L 33/04; C08L 33/06; C08L 35/02

[52] U.S. Cl. .......................... 525/222; 525/227; 525/228; 525/240; 525/241

[58] Field of Search .................................. 525/221, 222, 525/227, 228, 240, 241

[56] References Cited

U.S. PATENT DOCUMENTS 3,793,402  2/1974  Owens et al. .
5,169,903  12/1992  Toritani et al. .
5,777,034  7/1998  Shah et al. ............................. 525/228

FOREIGN PATENT DOCUMENTS 7-9484  1/1995  Japan .

*Primary Examiner*—Nathan M. Nutter
*Attorney, Agent, or Firm*—Birch, Stewart, Kolasch & Birch, LLP

[57] ABSTRACT

An acrylic film or sheet made from a resin composition comprising 95 to 50 wt. % of an acrylic resin which comprises methyl methacrylate as a main component and has a glass transition temperature in the range of 40 to 105° C., and 5 to 50 wt. % of a multilayer-structured acrylic polymer containing an elastomeric layer, wherein the polymer is dispersed in the acrylic resin, a molded article comprising a thermoplastic resin molded material and the above film or sheet which is adhered and unified with the surface of the molded material, and a method for the production of the above molded article are provided. This film or sheet is an excellent film for use in a simultaneous injection molding and lamination method.

6 Claims, No Drawings

ACRYLIC FILM AND MOLDINGS MADE USING THE SAME

This application is the national phase under 35 U.S.C. §371 of prior PCT International Application No. PCT/JP97/00382 which has an International filing date of Feb. 13, 1997 which designated the United States of America, the entire contents of which are hereby incorporated by reference.

FIELD OF THE INVENTION

The present invention relates to an acrylic film or sheet (henceforth referred to collectively as film) suitable for simultaneous injection molding and lamination, and to a molded article comprising the same.

PRIOR ART

As disclosed in U.S. Pat. No. 4,639,341 (JP-B-63-6339), JP-B-4-9647 and JP-A-7-9484, simultaneous injection molding and lamination methods are such that a film inserted into a cavity in between the male and female metal molds is unified with a molten resin injected into the mold cavity at the time of injection molding so as to apply decorations or patterns to the surface of a molded material. Such molding methods may be referred to as lamination or transfer printing methods according to the different types of films used.

Namely, in a lamination method, a whole layer of a patterned film made from a substrate film and a design layer is used as a patterned film for lamination (laminate film) to give an adhesively unified decorative layer on the surface of the molded material. In a transfer printing method, a transfer film is used, and only the base film of the unified transfer film is peeled off from the surface of the molded article, while the transfer layer such as the design layer, etc., remains on the side of the molded material and forms a decoratively printed layer.

Conventionally, using these kinds of methods, for example, vinyl chloride, polyester and polystyrene films and the like, with printed designs were applied to the surface of acrylonitrile butadiene styrene (ABS) resins or polystyrene resins by the lamination or transfer printing methods, to obtain molded articles.

Furthermore, molded articles with a printed design such as a woodgrain, etc., for use in interior appliances for automobiles have been produced by printing a design on the molded materials by a hydraulic transfer method, in which the design is printed on the surface of ABS resin molded materials (Curlfit method) and the like, and a coating of a transparent resin such as a urethane resin is applied on the surface of the molded materials to give added depth.

The aim of coating the resin surface in this way may mainly be to provide functionality such as protection of the substrate, surface functionality, transmission-preventing functionality, or to improve designing properties such as adjustment of gloss on the surface, creation of a stereoscopic effect (depth), application of a design, and moreover, to provide added structural strength.

The coating resin is a thermoplastic or thermosetting resin selected for its cost, functionality, appearance, and post-processability. The following are examples of thermoplastic resin films: polyvinyl chloride film (PVC film), polyolefin films, polyester films, acrylic resin films, fluororesin films and the like.

The acrylic resin films can be heat-fused with and fixed to PVC films, and the coating of the surface of the PVC film with the acrylic resin film is characterized in that the underneath PVC film can be protected because of good weather-resistance and ultraviolet (UV)-radiation shielding properties of the acrylic resin, so that the acrylic resin films can be used as coating materials for exterior building materials.

As this type of an acrylic film, JP-B-56-27378 describes a film made from a resin composition comprising an alkyl methacrylate as the main component, a UV-radiation absorber and the like.

As a multilayer-structured polymer composition, U.S. Pat. No. 4,052,525 (JP-A-51-129449) describes an acrylic resin film which has a multilayered structure and possesses excellent transparency and anti-stress-whitening characteristics, and in which the content of the alkyl methacrylate increases monotonously from the center to the outer layer.

As commercially available acrylic resin films, there are those acrylic films traded under the names of ACRYPREN or SUNDUREN.

Generally used PVC films have problems in that the above-mentioned weather-resistance is poor and also they pollute the atmosphere when they are incinerated as waste.

Furthermore, commercially available acrylic resin films used in the construction material field are generally soft and have low surface hardness.

The above-mentioned method for the clear coating of a transparent resin on the surface of a resin molded article which has previously been printed with a woodgrain design has problems in that, because the clear layers are piled up, the chances of production of defectives are high, costs are high, and the use of solvents in the factory may cause environmental pollution.

SUMMARY OF THE INVENTION

In view of such circumstances, the present inventors have intensively investigated on decorated molded articles maintaining surface hardness. As a result, it has been found that a film made from a resin composition comprising a specific acrylic resin and a multilayer-structured acrylic polymer containing an elastomeric layer, wherein the polymer is dispersed in the specific acrylic resin, is an excellent film for use in simultaneous injection molding-lamination, and maintains surface hardness, and that decorated molded products can be produced simply and inexpensively. Thus, the present invention has been completed.

Namely, the present invention provides an acrylic film or sheet made from a resin composition comprising 95 to 50 wt. % of an acrylic resin which comprises methyl methacrylate as a main component and has a glass transition temperature in the range of 40 to 105° C., and 5 to 50 wt. % of a multilayer-structured acrylic polymer containing an elastomeric layer, wherein the polymer is dispersed in the acrylic resin.

Preferably, one side of the above-mentioned acrylic film or sheet of the present invention has a printed design.

Furthermore, the present invention provides a molded article comprising a thermoplastic resin molded material, and the above-mentioned acrylic film or sheet of the present invention which is adhered and unified with the molded material.

Additionally, the present invention provides a method for the production of the above-mentioned molded article comprising the steps of:

inserting the above-mentioned acrylic film or sheet of the present invention into between male and female molds, and injection molding a thermoplastic resin in the molds so that said acrylic film or sheet is simultaneously laminated to the surface of the molded material obtained.

DETAILED DESCRIPTION OF THE INVENTION

The acrylic resin of the present invention comprising methyl methacrylate as a main component and having a glass transition temperature in the range of 40 to 105° C. is a copolymer comprising at least 50 wt. % of methyl methacrylate and less than 50 wt. % of at least one other copolymerizable vinyl monomer.

To prepare the acrylic resin having a glass transition temperature in the range of 40 to 105° C., the types and amounts of the copolymerizable monomers are adjusted. In other words, if the glass transition temperature of the homopolymer of a monomer used for the copolymerization is low, then a copolymer comprising this monomer will have a lowered glass transition temperature.

Examples of the vinyl monomer to be copolymerized with methyl methacrylate include methacrylic acid esters such as ethyl methacrylate, butyl methacrylate, cyclohexyl methacrylate, phenyl methacrylate, benzyl methacrylate, 2-ethylhexyl methacrylate, 2-hydroxyethyl methacrylate, etc.; acrylic acid esters such as methyl acrylate, ethyl acrylate, butyl acrylate, cyclohexyl acrylate, phenyl acrylate, benzyl acrylate, 2-ethylhexyl acrylate, 2-hydroxyethyl acrylate, etc.; unsaturated aliphatic acids such as acrylic acid, methacrylic acid, etc.; styrene, α-methyl styrene, acrylonitrile, metacrylonitrile, maleic anhydride, phenylmaleimide, cyclohexylmaleimide, and the like.

Among these, the acrylates are particularly preferable. And among the acrylates, alkyl acrylates are especially preferred, and those having the alkyl groups with the larger number of carbon atoms can reduce the glass transition temperature of the copolymer with a smaller amount.

As the acrylic resin of the present invention, an acrylic resin comprising 50 to 99 wt. % of methyl methacrylate and 50 to 1 wt. % of an alkyl acrylate is preferred. This copolymer may be used individually or in a mixture of a plurality of copolymers. The use of the mixture poses no problem as long as the glass transition temperature of the mixture is within the range of 40 to 105° C.

Acrylic resins having a glass transition temperature exceeding 105° C. are not desirable because it becomes difficult to maintain the temperature of the film obtained in the moldable temperature range for the film when the film of the present invention is shaped by adhering it to the molded material in the molds. When the glass transition temperature is less than 40° C., the heat resistance of the film of the present invention is lowered and thus it is not desirable for practical use.

The multilayer-structured acrylic polymer containing an elastomeric layer used in the present invention is preferably a multilayer-structured acrylic polymer powder having at least two layers.

Preferably, it is based on a three-layered structure consisting of the innermost layer made from a hard polymer comprising methyl methacrylate as a main component, the intermediate layer made from a soft elastomer comprising a copolymer of a polyfunctional monomer and an alkyl acrylate having 4 to 8 carbon atoms in the alkyl group, and the outermost layer made from a hard polymer comprising methyl methacrylate as a main component. The elastomeric layer is preferably contained in an amount of 20 to 60 wt. %.

Examples thereof are mentioned in, for example, U.S. Pat. No. 3,793,402 (JP-B-55-27576) or U.S. Pat. Nos. 5,169,903 and 5,338,804, as well as EP-A-404972 (JP-A-1-252653).

Five to fifty wt. % of the multilayer-structured acrylic polymer containing an elastomeric layer is dispersed in 95 to 50 wt. % of the acrylic resin.

When the amount of the multilayer-structured acrylic polymer containing an elastomeric layer is less than 5 wt. %, the impact strength of the film of the present invention decreases, and elongation at break is reduced, which is not favorable since the film cannot keep up with the stretching inside the molds during molding, and may tear. When the amount of the multilayer-structured acrylic polymer containing an elastomeric layer exceeds 50 wt. %, the surface hardness of the film is reduced undesirably.

The use of a single layer-structured elastomeric material is not favorable since the surface hardness of the resulting film is severely reduced.

The method of dispersing the multilayer-structured acrylic polymer containing an elastomeric layer in the acrylic resin is not especially limited, insofar as it can mix the polymer with the resin uniformly. In general, extruders are used to disperse the polymer, since they can mix the components thoroughly and melt and mix the thermoplastic resins.

During the melt-mixing, the mixture may be compounded with known agents such as hindered phenol-based antioxidants, phosphorous-based antioxidants and sulfur-based antioxidants, weather-resistant agents such as UV radiation absorber or hindered amine-based light stabilizer; flame retardants, colorants, pigments, inorganic fillers, and the like.

As UV radiation absorbers, generally benzotriazole- or benzophenone-based UV radiation absorbers are used individually or in combination. Among these, benzotriazole-based UV radiation absorbers with a high molecular weight are preferred, as they have the advantages of not evaporating away from the film and of preventing deterioration of the printed design. Specifically, 2,2-methylenebis[4-(1,1,3,3-tetramethylbutyl)-6-(2H-benzotriazol-2-yl)phenol] is preferably used. It is desirably added in an amount of at least 1000 ppm.

The film of the present invention can be manufactured by the well-known methods such as an extrusion casting method with chill-rolls, an extrusion molding method in which both surfaces of the film touch the surfaces of cooling rolls, a belt-cooling extrusion method in which the film touches a metal belt, an inflation extrusion molding method, a solvent casting method, or the like.

Among them, the extrusion molding method in which both surfaces of a film touch the surfaces of rolls and the belt-cooling extrusion method, by which a film in good surface conditions can be obtained, are desirable, in view of a reduction in haze on the outer portion of the obtained film or sheet, and printing properties of design, namely, an effect of preventing a printing mistake.

The film of the present invention is often used in a form that the film has a design on one side, or is colored in the simultaneous injection molding and lamination method. Sometimes, the film, which has been previously shaped by thermoforming such as vacuum forming, etc., can be used in the simultaneous injection molding and lamination method.

Furthermore, the film of the present invention may be used as an outermost layer of a multilayer film. That is, the film of the present invention may be lined with other film such as a polyvinyl chloride film, a transparent ABS film, etc. to form a multilayer film.

The thickness of the film of the present invention is preferably in the range of 0.1 to 0.6 mm.

The film of the present invention is usually supplied in the molds, after a design is printed on the film, with the printed surface of the film facing the side of the resin which will be injected in a molten state in the injection molding molds. This is because it is aimed to give added depth through the transparent (clear) layer in the final molded article. Thus, the film thickness of less than 0.1 mm is undesirable, since the final article has the insufficient depth of the printed design.

When the simultaneous injection molding and lamination according to the present invention is carried out in the mold in industries, it is preferable to continuously supply the film in the mold cavity. Therefore, the film thickness of larger than 0.6 mm is undesirable since such a thick film or sheet cannot be taken up in the form of a roll.

As a resin which is injected in a molten state into the mold cavity in the simultaneous injection molding and lamination method according to the present invention, for example, ABS resins, polycarbonate resins, polystyrene resins, or polyolefin resins can be used. Among them, the ABS and polycarbonate resins are preferably selected in view of the impact resistance, dimensional stability and the like of the final products.

The simultaneous injection molding and lamination method of the present invention may be carried out in the same way as those described in U.S. Pat. No. 4,639,341 (JP-B-63-6339), JP-B-4-9647 and JP-A-7-9484. That is, the male and female molds, which form a cavity space, are opened, the film is inserted between the molds, and the molds are closed with pinching the film between the molds, and compressed. Then, the molten resin is injected and filled in the cavity through a gate, followed by cooling and solidifying, so that the film is adhered to and unified with the injection molded material. Finally, the molds are opened, and the molded article is removed.

The injection molding conditions such as a resin temperature, injection pressure, and the like are suitably set by taking the kinds of resins, etc. into account.

The acrylic film of the present invention is an excellent film for simultaneous injection molding and lamination. The use of this film can achieve the easy and inexpensive production of the molded article maintaining a surface hardness and possessing a transparency with a depth.

EXAMPLES

The present invention will be illustrated by the examples, which do not limit the scope of the invention in any way.

The evaluation methods are as follows:

(1) Formation of unevenness during molding

The surface condition of a film-laminated molded article was observed with an eye. Then, one having good surface condition was ranked as "A", one having minute unevenness was ranked as "C", and one having the intermediate surface condition was ranked as "B".

(2) Gauze abrasion resistance

A piece of gauze was set on a measuring tool of an abrasion tester Model D for a color fastness test of dyeing (manufactured by TOYO SEIKI SEISAKUSHO), and a film is subjected to an abrasion test for 500 times under a load of 200 g. The abraded state of the film was observed with an eye. A film which was not abraded was ranked as "A", one which was abraded was ranked as "C", and one which was in-between them was ranked as "B".

(3) Surface hardness

The pencil hardness of a film was measured according to JIS K 5400.

(4) Transparency

A total light transmittance (Tt) and a haze were measured according to JIS K 6718.

(5) Glass transition temperature (Tg)

A film sample was heated with a differential scanning calorimeter (DSC) at a heating rate of 10° C./min., and a temperature at which the endothermic change started was recorded according to a tangent method.

(6) Number of printing mistakes

A design was gravure printed on one side of a film, and the film having an area of about 1 m in width and about 10 m in length was examined with an eye. Then, the number of printing mistakes was counted and converted into the number per one square meter ($m^2$).

Example 1

Pellets (76 wt. parts) of an acrylic resin (97.8 wt. % of methyl methacrylate units and 2.2 wt. % of methyl acrylate units), which had been prepared by bulk polymerization, and a spherical three-layer-structured acrylic polymer (24 wt. parts) having an elastomeric layer (having the innermost layer of a crosslinked methyl methacrylate polymer, the intermediate layer of a soft elastomer comprising butyl acrylate as a main component and the outermost layer of a methyl methacrylate polymer; average particle size of 300 nm) (see Example 3 of U.S. Pat. No. 3,793,402 =JP-B-55-27576) were mixed with a super mixer, and molten and kneaded with a twin screw extruder, followed by pelletizing.

The pellets were extruded with a single screw extruder having a diameter of 65 mm (manufactured by Toshiba Machine Co., Ltd.) through a T-die which was set at a temperature of 255° C. Then, the resulting film was cooled by allowing the both surfaces of the film in entire contact with polishing rolls, to obtain an acrylic resin film having a thickness of 0.13 mm.

The obtained film having a thickness of 0.13 mm was placed in between molds for injection molding, and then an ABS resin was injected on the back surface of the film so that the thickness of the resin was 3 mm. Thus, a molded article was obtained.

During the molding, the temperature of the acrylic resin film was 130° C., that of the molds was 50° C., and the injection molding conditions included an injection pressure of 1150 kg/$cm^2$ and an ABS resin temperature of 230° C.

The results of the evaluations of the film and the molded article are shown in Table 1.

Example 2

The powder (75 wt. parts) of an acrylic resin (87 wt. % of methyl methacrylate units, 3 wt. % of methyl acrylate units and 10 wt. % of butyl acrylate units), which had been prepared by suspension polymerization, and the same three-layer-structured acrylic polymer having an elastomeric layer as that used in Example 1 (25 wt. parts) were mixed with a super mixer, and molten and kneaded with a twin screw extruder, followed by pelletizing.

The pellets were extruded with a single screw extruder having a diameter of 65 mm (manufactured by Toshiba Machine Co., Ltd.) through a T-die which was set at a temperature of 255° C. Then, a film was cooled by allowing the both surfaces of the film in entire contact with a cooling machine having continuous stainless steel belts, to obtain an acrylic resin film having a thickness of 0.13 mm.

Then, a molded article was produced in the same manner as in Example 1 except that the above acrylic film was used.

The results of the evaluations of the film and the molded article are shown in Table 1.

Example 3

An acrylic film and a molded article were produced in the same manners as in Example 2 except that the film was cooled by allowing only one surface of the film in contact with a polishing roll.

The results of the evaluations of the film and the molded article are shown in Table 1.

Comparative Example 1

A molded article was produced in the same manner as in Example 1, except that a commercially sold acrylic film (ACRYPREN HBX 006 available from Mitsubishi Rayon Co., Ltd.; thickness of 0.1 mm) was used.

This film was observed with a transmission electron microscope, and it was confirmed that it is a monolayer-structured elastomeric rubber film.

The results of the evaluations of the film and the molded article are shown in Table 1.

TABLE 1

| | Glass transition temp. (Tg) (° C.) | Pencil hardness | Gauze abrasion | Optical properties | | Formation of unevenness during molding | No. of printing mistakes /m² |
|---|---|---|---|---|---|---|---|
| | | | | Tt (%) | Haze (%) | | |
| Ex. 1 | 97 | HB | B | 93 | 0.9 | B | 0.4 |
| Ex. 2 | 75 | HB | A | 93 | 0.4 | A | 0.1 |
| Ex. 3 | 75 | HB | A | 92 | 2.5 | A | 7.8 |
| C. Ex. 4 | 75 | <4B | C | 92 | 2.1 | A | 8.2 |

What is claimed is:

1. A method for the production of a molded article comprising the steps of:

inserting in between male and female molds an acrylic film or sheet, made from a resin composition comprising 95 to 50 wt. % of an acrylic resin which comprises methyl methacrylate as a main component and has a glass transition temperature in the range of 40 to 105° C., and 5 to 50 wt. % of a three-layer-structured acrylic polymer consisting of an innermost layer made from a hard polymer comprising methyl methacrylate as a main component, an intermediate layer made from a soft elastomer comprising a copolymer of a polyfunctional monomer and an alkyl acrylate having 4 to 8 carbon atoms in the alkyl group, and an outermost layer made from a hard polymer comprising methyl methacrylate as a main component, wherein the three-layer-structured polymer is dispersed in the acrylic resin, and injection molding a thermoplastic resin in the molds so that said acrylic film or sheet is simultaneously laminated to the surface of the molded material obtained.

2. The method for the production of a molded article according to claim 1, wherein said acrylic resin is an acrylic resin comprising 50 to 99 wt. % of methyl methacrylate and 50 to 1 wt. % of an alkyl acrylate.

3. The method for the production of a molded article according to claim 1, wherein said acrylic film or sheet has a thickness of 0.1 to 0.6 mm.

4. The method for the production of a molded article according to claim 1, wherein one side of said acrylic film or sheet has a printed design.

5. The method for the production of a molded article according to claim 1, wherein said acrylic film or sheet is produced by an extrusion molding method in which both sides of the film or sheet touch the surfaces of cooling rolls, or a belt-cooling method in which both sides of the film or sheet touch the surfaces of the metal belts.

6. The method for the production of a molded article according to claim 1, wherein said thermoplastic resin is an acrylonitrile-butadiene-styrene resin or a polycarbonate resin.

* * * * *